US012667931B2

(12) United States Patent
Miyagi

(10) Patent No.: US 12,667,931 B2
(45) Date of Patent: Jun. 30, 2026

(54) POWER TOOL

(71) Applicant: NITTO KOHKI CO., LTD., Tokyo (JP)

(72) Inventor: Takanori Miyagi, Tokyo (JP)

(73) Assignee: NITTO KOHKI CO., LTD., Tokyo (JP)

( * ) Notice: Subject to any disclaimer, the term of this patent is extended or adjusted under 35 U.S.C. 154(b) by 337 days.

(21) Appl. No.: 18/428,611

(22) Filed: Jan. 31, 2024

(65) Prior Publication Data

US 2024/0261928 A1 Aug. 8, 2024

(30) Foreign Application Priority Data

Feb. 3, 2023 (JP) ................................ 2023-015223

(51) Int. Cl.
*B24B 23/06* (2006.01)
*B25F 5/00* (2006.01)
*B25F 5/02* (2006.01)

(52) U.S. Cl.
CPC .............. *B24B 23/06* (2013.01); *B25F 5/008* (2013.01); *B25F 5/02* (2013.01)

(58) Field of Classification Search
CPC . B24B 23/06; B25F 5/008; B25F 5/02; H02K 9/26; F21S 9/02
See application file for complete search history.

(56) References Cited

U.S. PATENT DOCUMENTS

2019/0262753 A1* 8/2019 Miura ..................... F02B 63/02
2021/0046631 A1* 2/2021 Osawa .................... B25F 5/008
2023/0278166 A1* 9/2023 Yang ....................... B24B 23/02 451/456
2023/0398656 A1* 12/2023 Christophersen ....... B24B 21/20
2025/0018546 A1* 1/2025 Heinzelmann .......... B27B 17/00
2025/0381656 A1* 12/2025 Yamaguchi ............. B25F 5/008

FOREIGN PATENT DOCUMENTS

JP 6252778 12/2017
JP 6661328 3/2020

* cited by examiner

*Primary Examiner* — Omar Flores Sanchez
(74) *Attorney, Agent, or Firm* — Burris Law, PLLC

(57) ABSTRACT

A power tool is configured to permit a part for suppressing play of a battery and a filter to be replaced together in a single operation. The power tool (belt-type grinding tool) is driven by a detachably loaded battery. The power tool includes a housing having a battery loading part and an air inlet opening, and a filter component detachably attached to the housing. The filter component has a filter covering the air inlet opening and a filter securing part holding the filter and secured to the housing. The filter securing part has a frame portion surrounding the perimeter of the filter, and three mounting leg portions extending from the frame portion. The first and second mounting leg portions partially project into the battery loading part. The first and second mounting leg portions abut against the battery to suppress play of the battery with respect to the housing.

6 Claims, 11 Drawing Sheets

POWER TOOL

CROSS-REFERENCE TO RELATED APPLICATION

This application claims priority to and the benefit of JP 2023-015223 filed on Feb. 3, 2023. The disclosure of the above application is incorporated herein by reference.

FIELD

The present disclosure relates to a power tool driven by a battery.

BACKGROUND

Among power tools such as belt-type grinding tools and grinders, there has been developed a power tool configured to be driven by using a detachable battery as a power supply. Because such a power tool vibrates when driven, necessary vibration countermeasures are applied to various parts thereof. In particular, a detachably loaded battery is loaded in a battery loading part of the power tool with some room provided therein and is, therefore, likely to vibrate against the battery loading part. Consequently, the connecting terminals of the power tool and the battery are rubbed against each other to become worn, so that a contact failure may occur. In addition, if the connecting terminals of the power tool and the battery come in and out of contact repeatedly, sparks can be produced between the terminals, and the sparks may melt resin portions that hold the metal terminals, causing a change in position of the terminals, which may also cause a contact failure.

To prevent occurrence of the above-described vibration and play of the battery, Japanese Patent No. 6661328, for example, discloses that an elastic absorbing member is attached into a slide rail part for loading a battery so that the battery is elastically supported by the elastic absorbing member, thereby absorbing vibration.

Further, power tools may need to cool an electric motor, which generates heat when driven. Japanese Patent No. 6252778, for example, discloses that a fan is attached to a rotating shaft of a motor disposed in a housing, and the outside air is sucked into the housing by the fan rotated by the motor so as to pass around the motor before being discharged to the outside of the housing, thereby cooling the motor. In an air inlet opening, a filter is disposed to prevent dust from entering the housing.

The elastic absorbing member for suppressing vibration of the battery is gradually worn as the battery loading and unloading operations are repeated, and the elastic absorbing member deteriorates with elapse of time. Therefore, the elastic absorbing member needs to be replaced regularly. In addition, the filter fitted in the air inlet opening is gradually contaminated with use. Therefore, the filter also needs regular replacement. However, the elastic absorbing member and the filter are mounted at different positions as separate members, respectively. Therefore, the elastic absorbing member and the filter need to be replaced individually. Accordingly, the replacing operation is troublesome, and if located in an inconspicuous spot, particularly, the elastic absorbing member may be left unreplaced, resulting in being incapable of exhibiting the required function.

SUMMARY

Accordingly, an object of the present disclosure is to provide a power tool configured to permit a part for suppressing play of a battery and a filter to be replaced together in a single operation.

The present disclosure provides a power tool configured to be driven by a detachably loaded battery. The power tool may include a housing having a battery loading part and an air inlet opening, and a filter component detachably attached to the housing. The filter component may have a filter covering the air inlet opening and a filter securing part holding the filter and secured to the housing, the filter securing part being partially exposed into the battery loading part. When a battery is loaded into the battery loading part, the filter securing part may abut against the battery to suppress play of the battery with respect to the housing.

In the power tool, the filter securing part of the filter component is configured to abut against the battery so as to function as a part for suppressing play of the battery. Consequently, by replacing the filter component, the filter, which covers the air inlet opening, and the part for suppressing play of the battery can be replaced together in a single operation.

Further, the battery loading part may be configured such that the battery is loaded thereinto by sliding the battery in a predetermined sliding direction, and the air inlet opening may have a first air inlet opening and a second air inlet opening which are respectively formed in surfaces opposite to each other in a direction perpendicular to the sliding direction. The filter component may be attached to each of the first air inlet opening and the second air inlet opening. The filter component attached to the first air inlet opening and the filter component attached to the second air inlet opening may have the same configuration.

Further, the filter securing part may have a frame portion surrounding the perimeter of the filter to hold the filter, and first to third mounting leg portions projecting in the same direction from the frame portion. The first to third mounting leg portions may be disposed to form an isosceles triangle in which the first mounting leg portion is at a vertex forming a vertex angle and the second and third mounting leg portions are at vertexes forming two base angles, respectively. The first mounting leg portion and one of the second mounting leg portion and the third mounting leg portion may be exposed into the battery loading part to abut against the battery.

Further, each of the second and third mounting leg portions may have a flat surface chamfered in a direction perpendicular to the base of the isosceles triangle to face outward of the isosceles triangle, so that when the battery is loaded into the battery loading part, one of the flat surfaces of the second and third mounting leg portions engages the battery.

Further, the battery loading part may be configured such that the battery is loaded thereinto by sliding the battery in a predetermined direction, and the first mounting leg portion may have a circular columnar shape so that when the battery is loaded into the battery loading part, the first mounting leg portion is pressed in the sliding direction by the battery.

Further, the power tool further may include a motor disposed in the housing, and a fan attached to a rotating shaft of the motor, so that when the fan is rotated by the motor, the outside air is sucked into the housing from the air inlet opening through the filter to pass around the motor before being discharged from the housing.

A form of a power tool according to the present disclosure will be explained below on the basis of the accompanying drawings.

DRAWINGS

Figure 10:
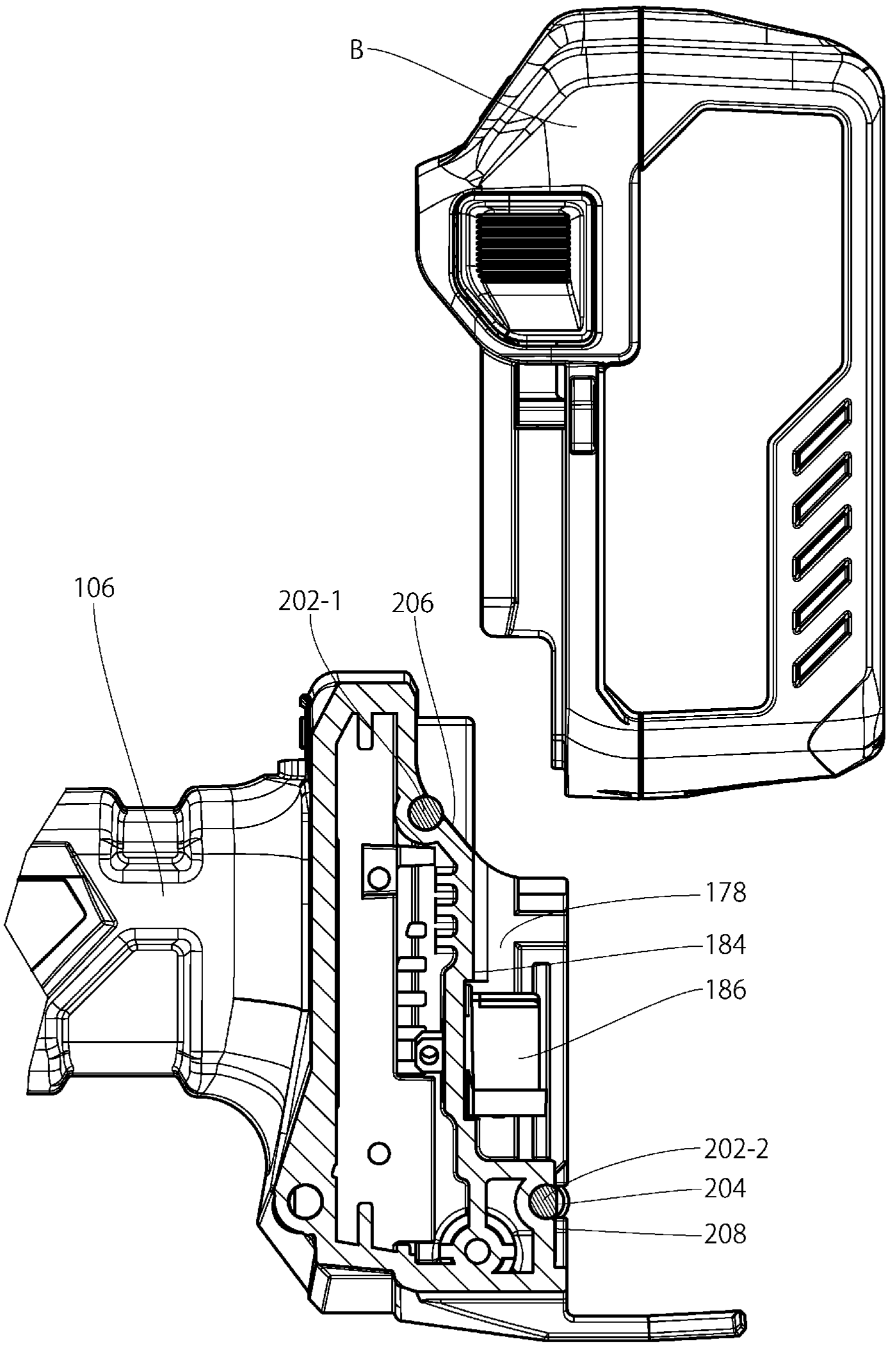
Figure 11:
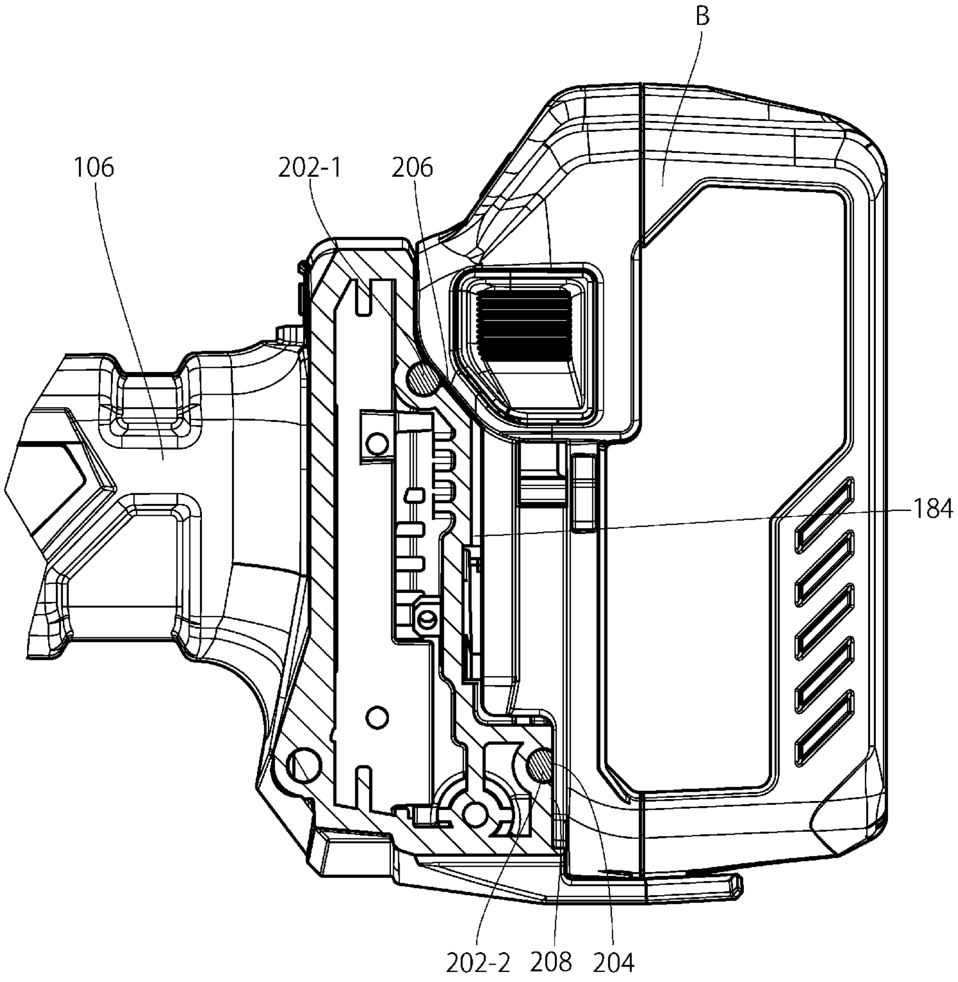

FIG. 10 is a partially sectioned view showing the surroundings of a battery loading part in a state where the battery loading part is not loaded with a battery, according to the teachings of the present disclosure; and FIG. 11 is a partially sectioned view showing the surroundings of the battery loading part in a state where the battery loading part is loaded with a battery, according to the teachings of the present disclosure.

DETAILED DESCRIPTION

Figure 1:
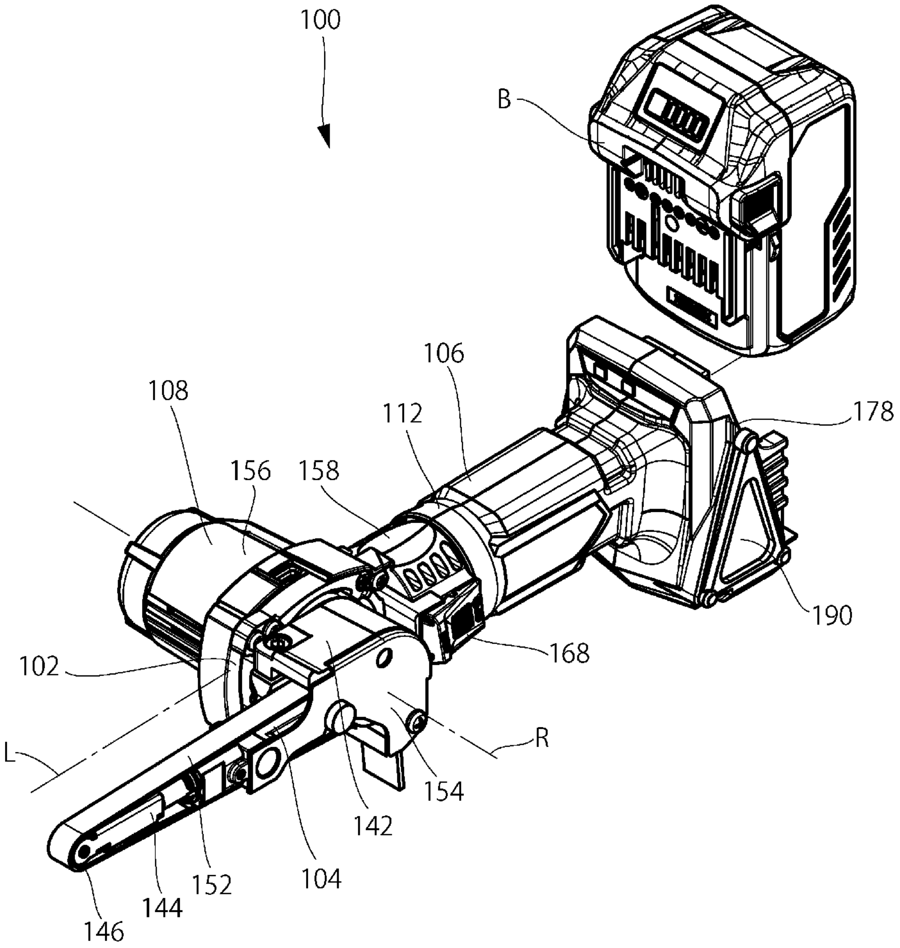
FIG. 1 is a perspective view of a power tool (belt-type grinding tool) according to one form of the present disclosure.
Figure 2:
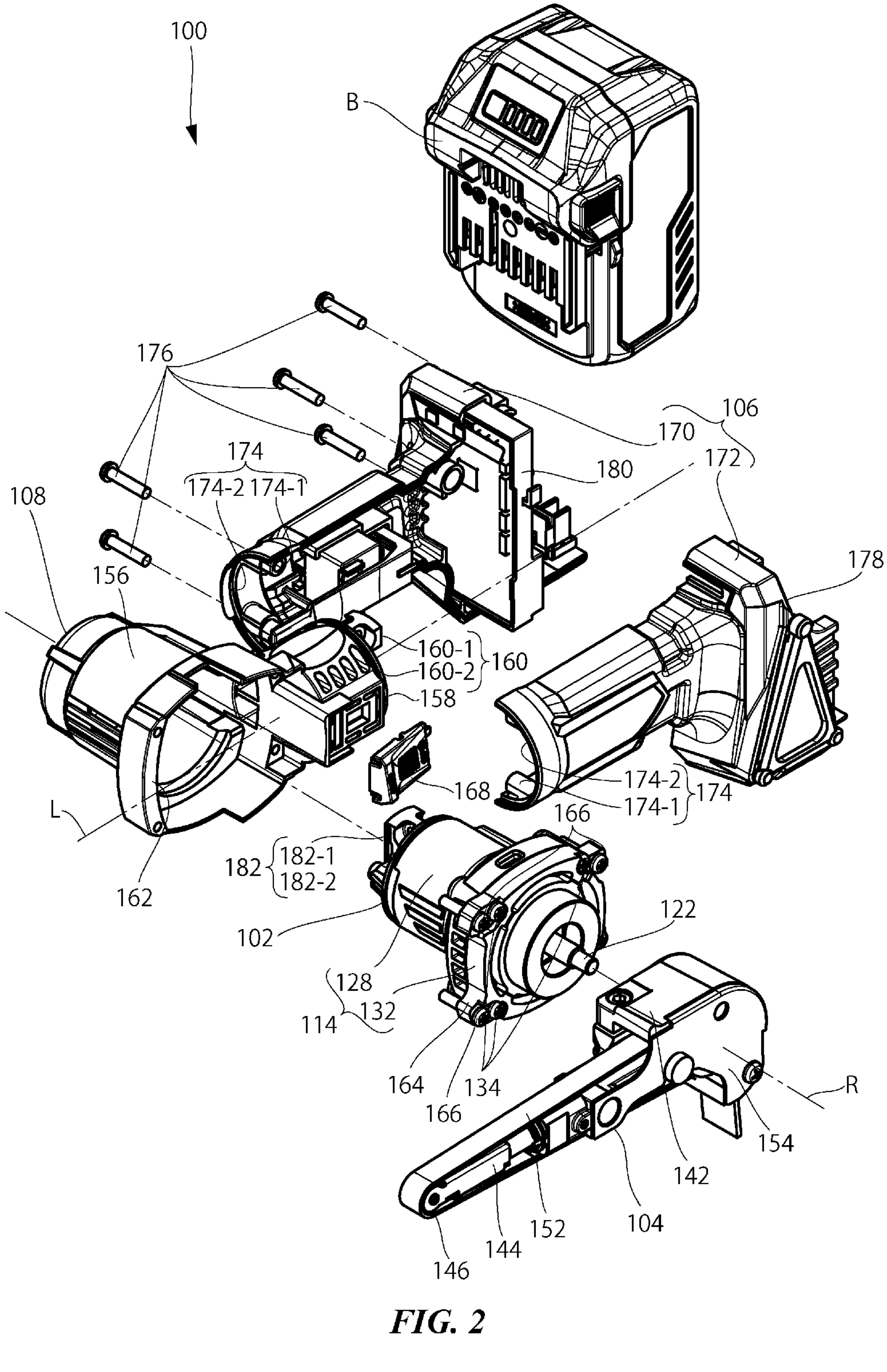
FIG. 2 is an exploded perspective view of the belt-type grinding tool shown in FIG. 1.
Figure 3:
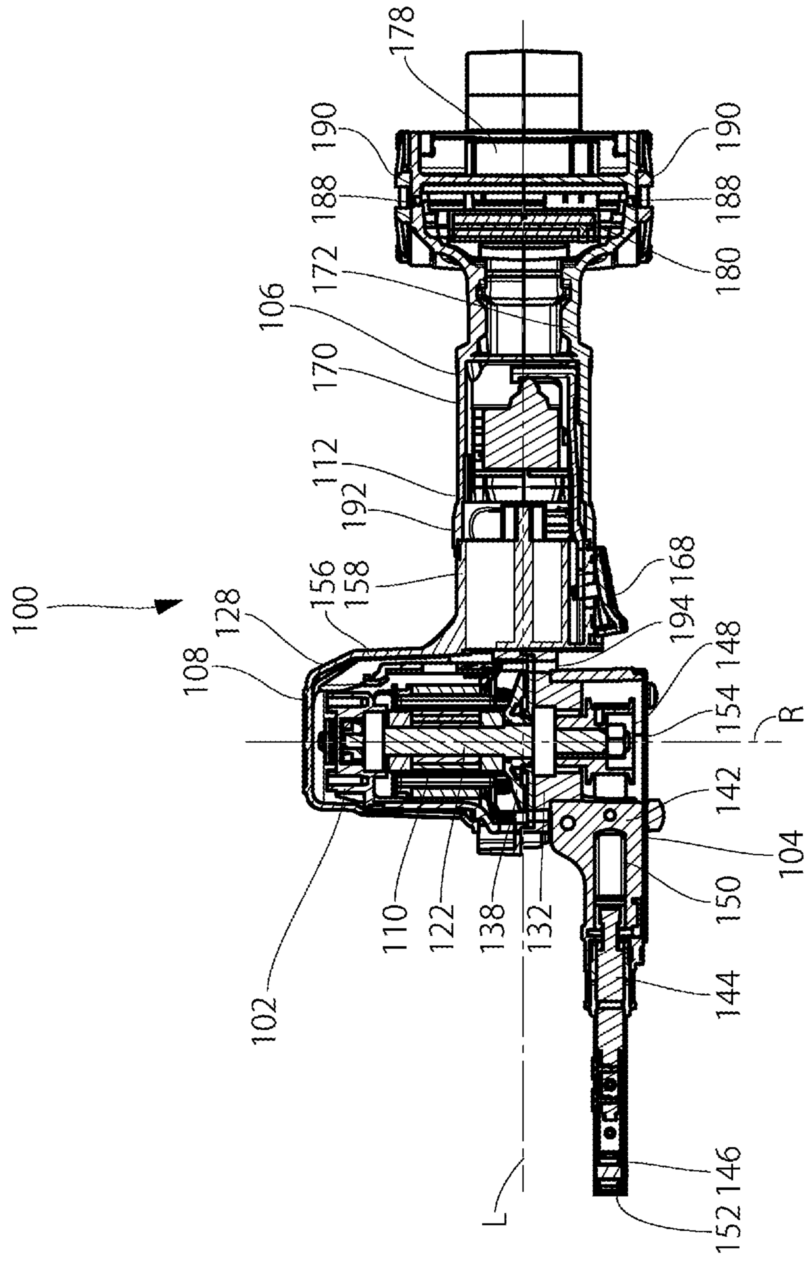
FIG. 3 is a sectional top view of the belt-type grinding tool shown in FIG. 1.

As shown in FIGS. 1 to 3, a power tool 100 according to one form of the present disclosure is a battery-operated belt-type grinding tool 100 configured to perform a grinding operation by rotationally driving an endless grinding belt.

The belt-type grinding tool 100 includes a motor unit 102 having a built-in motor 110, a drive unit 104 attached to the motor unit 102, a grip component 106 constituting a grip part 112 to be gripped by an operator, and a grip adapter 108 attached between the motor unit 102 and the grip component 106.

Figure 4:
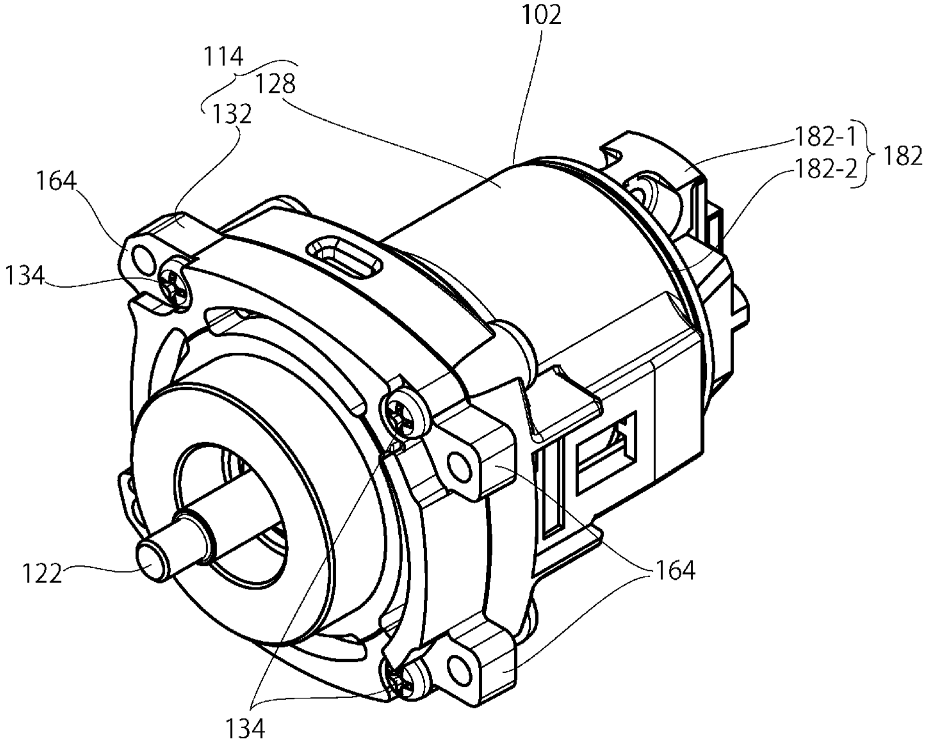
FIG. 4 is a front perspective view of a motor unit of the belt-type grinding tool shown in FIG. 1.
Figure 5:
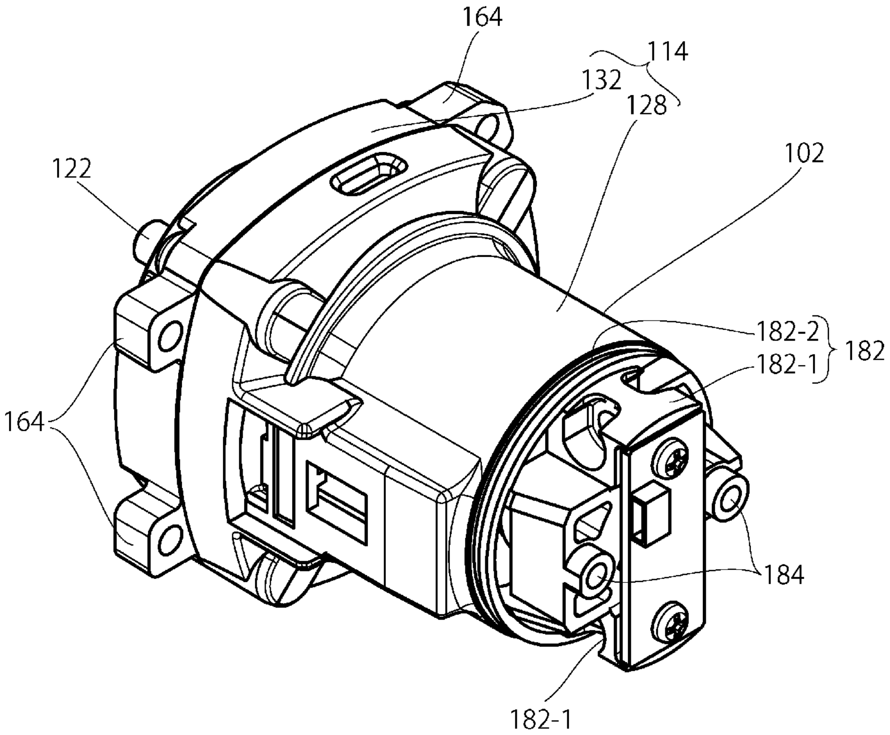
FIG. 5 is a rear perspective view of the motor unit shown in FIG. 4.
Figure 6:
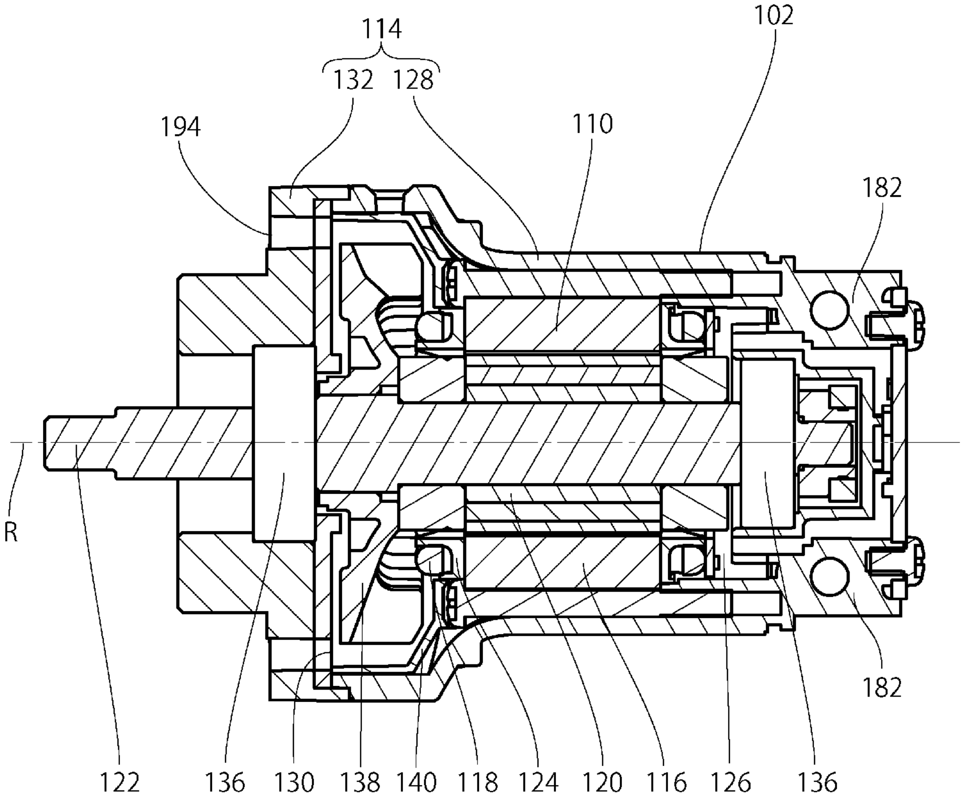
FIG. 6 is a sectional side view of the motor unit shown in FIG. 4.

As shown in FIGS. 4 to 6 in detail, the motor unit 102 mainly includes a motor 110 and a motor casing 114 accommodating the motor 110. The motor 110 is a brushless motor, which has a stator core 116 secured to the motor casing 114, a stator coil 118 wound around the stator core 116, a rotor 120 disposed inside the stator core 116 so as to be rotatable around a rotation axis R relative to the stator core 116, and a rotating shaft 122 secured to the rotor 120. The motor 110 further has an insulator 124 with insulating properties disposed between the stator coil 118 and the stator core 116. The insulator 124 is a resin member integrally molded with the stator core 116. The motor casing 114 comprises a motor housing 128 having an accommodating recess 126 accommodating the stator core 116 and the rotor 120 of the motor 110, and a bracket 132 attached to the motor housing 128 at a side thereof closer to an opening 130 of the accommodating recess 126. The bracket 132 is secured to the motor housing 128 by four screws 134 (see FIG. 4), thereby holding the motor 110 in the accommodating recess 126. The rotating shaft 122 is rotatably retained by two bearings 136 such that an end portion of the rotating shaft 122 projects from the bracket 132. Further, the rotating shaft 122 is secured to the rotor 120 and rotationally driven together with the rotor 120. The motor unit 102 further includes a fan 138 secured to the rotating shaft 122 in the motor casing 114, and an airflow guide member 140 for directing radially outward flow of air induced by the fan 138 toward the bracket 132. The motor housing 128 is formed as a cup-shaped integral member made of a resin. Although it is generally common practice to form this kind of housing from two split members, the motor housing 128 of the present disclosure is formed as an integral member. Consequently, the motor housing 128 has high mechanical strength as compared to the split-type housing and permits even more accurate centering of the rotor 120 and the stator core 116.

As shown in FIG. 3, the drive unit 104 includes a base component 142 secured to the bracket 132 of the motor unit 102, a tension bar 144 attached to the base component 142 displaceably in the longitudinal direction, an idle pulley 146 rotatably attached to the distal end of the tension bar 144, and a drive pulley 148 secured to the rotating shaft 122 of the motor unit 102. The tension bar 144 is urged forward (leftward as seen in FIG. 3) by a spring 150. In addition, the idle pulley 146 and the drive pulley 148 are wound with an endless grinding belt 152. The endless grinding belt 152 is installed between the idle pulley 146 and the drive pulley 148 in a state where a tension is applied thereto by the urging force of the spring 150. The base component 142 has an openable cover 154 attached to a side surface thereof so as to cover the drive pulley 148.

As shown in FIG. 2, the grip adapter 108 has a housing portion 156 accommodating the motor casing 114, and an extended portion 158 extending rearward from the housing portion 156. The extended portion 158 is provided with a grip securing portion 160 for attaching the grip component 106. The grip securing portion 160 has a boss 160-1 extending rearward from the extended portion 158 and an annular locking groove 160-2 formed on the outer peripheral surface of the extended portion 158. The grip adapter 108 is secured to adapter securing portions 164 of the bracket 132 by four screws 166 at an end face 162 of the housing portion 156. Further, the grip adapter 108 is configured to be provided with a switch 168 for switching on/off the operation of the belt-type grinding tool 100.

The grip component 106 has a first split member 170 and a second split member 172, which are formed as discrete components. The first split member 170 and the second split member 172 have securing portions 174 formed at respective forward ends thereof, which are configured to be attached to the grip securing portion 160 of the grip adapter 108. The securing portions 174 respectively have projecting portions 174-1 projecting so as to extend laterally inside the first split member 170 and the second split member 172, and annular projections 174-2 projecting radially inward at the forward ends of the first and second split members 170 and 172. The grip component 106 is secured to the grip adapter 108 by securing the first split member 170 and the second split member 172 to each other by five screws 176 in a state where the boss 160-1 is laterally held by the projecting portions 174-1 of the first and second split members 170 and 172 and where the annular locking groove 160-2 is locked by the annular projections 174-2. Two of the five screws 176 are tightened through the projecting portions 174-1 of the first and second split members 170 and 172 and the boss 160-1 of the grip component 106. The grip component 106 has a battery loading part 178 formed at a rear end thereof to load a battery B therein. Further, a built-in control circuit 180 is provided near the battery loading part 178 to control the belt-type grinding tool 100.

As will be clear from FIGS. 4 and 5, the motor casing 114 has a grip securing portion 182 formed at a rear end thereof. The grip securing portion 182 has a boss 182-1 and an annular locking groove 182-2 which are similar in shape to those of the grip securing portion 160 of the grip adapter 108. Accordingly, the grip component 106 can be attached directly to the motor casing 114 by detaching the grip adapter 108 in the configuration shown in FIG. 1 from the motor casing 114.

Figure 7:
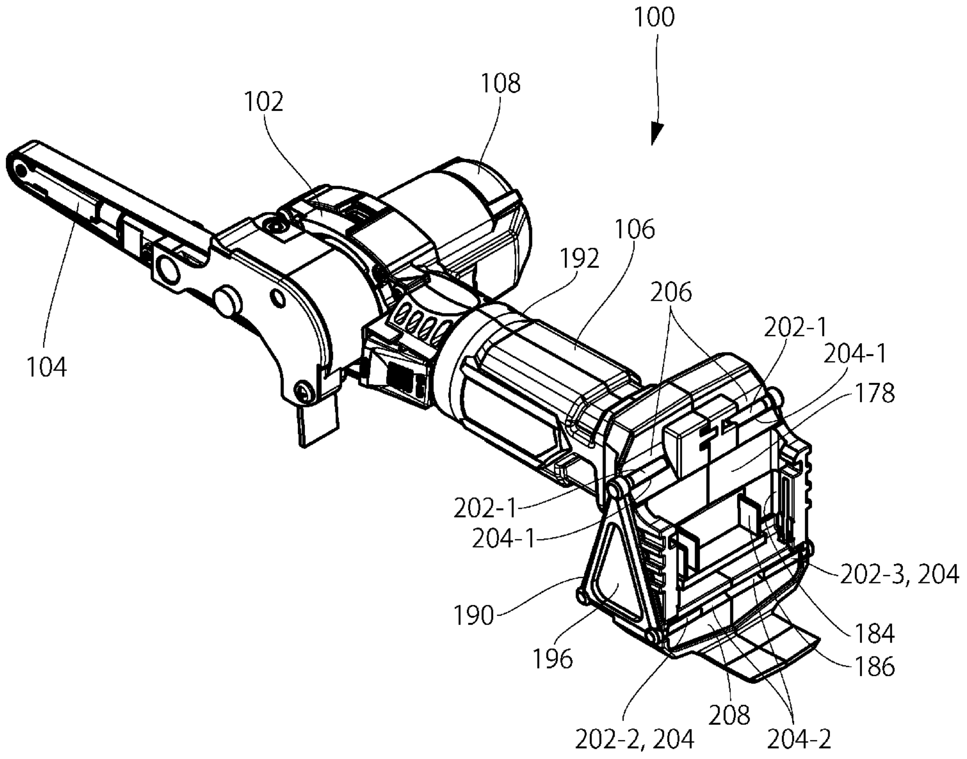
FIG. 7 is a perspective view of the belt-type grinding tool shown in FIG. 1, as seen from the rear, with filter components fitted thereto, according to the teachings of the present disclosure.
Figure 8:
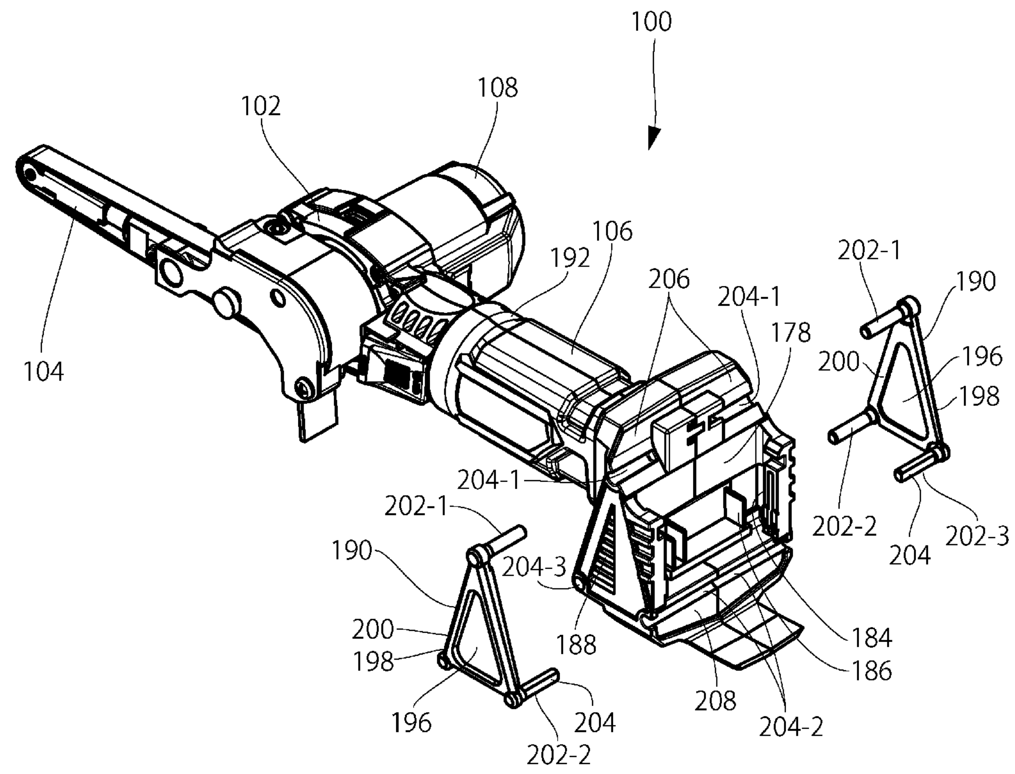
FIG. 8 is a perspective view of the belt-type grinding tool shown in FIG. 1, as seen from the rear, with the filter components removed therefrom, according to the teachings of the present disclosure.

As shown in FIG. 7, the battery loading part 178 includes vertically extending slide grooves 184 and connecting terminals 186 for electrically connecting to the battery B. By sliding the battery B downward along the slide grooves 184, the battery B is loaded into the battery loading part 178 and electrically connected to the connecting terminals 186. As shown in FIGS. 3 and 8, air inlet openings (first and second air inlet openings) 188 are formed in left and right side surfaces of a part of the grip component 106 that constitutes the battery loading part 178. In addition, filter components 190 are attached to the left and right side surfaces so as to cover the air inlet openings 188, respectively.

In the belt-type grinding tool 100, a housing 192 of the tool comprises the motor casing 114 of the motor unit 102, the grip adapter 108, and the grip component 106. When the fan 138 is rotated by the motor 110, the outside air is sucked into the housing 192 from the air inlet openings 188 of the housing 192 through the filter components 190. The sucked air flows inside the housing 192 and passes around the motor 110 before being discharged from air outlet openings 194 (FIGS. 3 and 6). In this way, the motor 110 is cooled by the flow of air.

Figure 9:
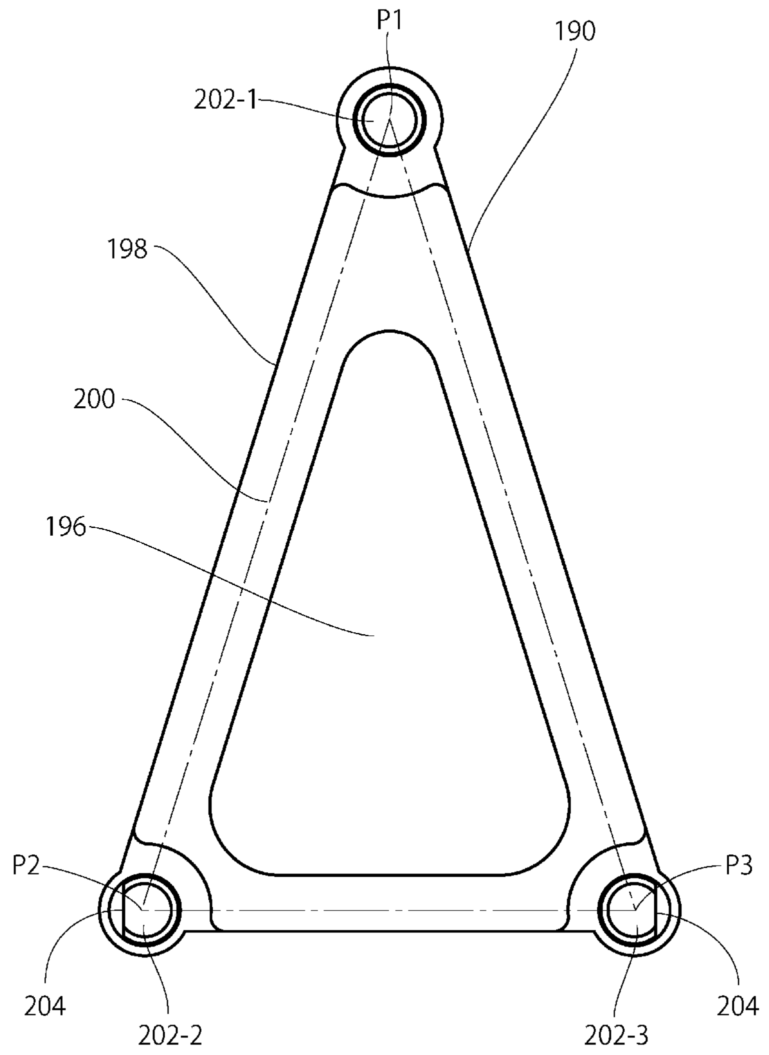
FIG. 9 is a plan view of the back side of a filter according to the teachings of the present disclosure.

As shown in FIGS. 8 and 9, the filter components 190 each have a filter 196 formed from a mesh-shaped member, and a filter securing part 198 for securing the filter 196 to the grip component 106, which constitutes the housing 192. The filter securing part 198 has an isosceles triangle-shaped frame portion 200 holding the filter 196 by surrounding the perimeter of the filter 196, and first to third mounting leg portions 202-1, 202-2 and 202-3 extending so as to project in the same direction from vertexes P1, P2 and P3, respectively, of the frame portion 200. The first mounting leg portion 202-1 is disposed at the first vertex P1 which forms a vertex angle of an isosceles triangle, and the second and third mounting leg portions 202-2 and 202-3 are disposed at the second vertex P2 and the third vertex P3 which form two base angles, respectively, of the isosceles triangle. The first mounting leg portion 202-1 has a circular columnar shape with a circular cross-section. The second and third mounting leg portions 202-2 and 202-3 have flat surfaces 204, respectively, which are chamfered vertically (in a direction perpendicular to the base of the isosceles triangle) so as to face outward of the isosceles triangle. That is, the second and third mounting leg portions 202-2 and 202-3 have a D-shaped cross-section. The two filter components 190 have the same bilaterally symmetric configurations. The frame portion 200 and first to third mounting leg portions 202-1, 202-2 and 202-3 of each filter component 190 are formed of an elastic material, e.g., rubber or resin.

As shown in FIG. 8, around the perimeter of the air inlet opening 188 formed in the housing 192 are provided a first mounting portion 204-1 for receiving the first mounting leg portion 202-1 of the filter component 190, a second mounting portion 204-2 for receiving the second mounting leg portion 202-2, and a third mounting portion 204-3 for receiving the third mounting leg portion 202-3. The first mounting portion 204-1 and the second mounting portion 204-2 are formed as laterally extending arcuate grooves opening into the battery loading part 178. The third mounting portion 204-3 is formed as a laterally extending circular hole. The filter component 190 is detachably attached to the grip component 106 by inserting the first to third mounting leg portions 202-1, 202-2 and 202-3 into the first to third mounting portions 204-1, 204-2 and 204-3, respectively. When the filter component 190 is attached to the grip component 106, as shown in FIG. 7, the first and second mounting leg portions 202-1 and 202-2 are partially exposed into the battery loading part 178. It should be noted that the far-side surface (as seen in FIGS. 7 and 8) of the housing 192 are also formed with first to third mounting portions 204-1, 204-2 and 204-3. At the far-side surface, however, the second mounting leg portion 202-2 of the filter component 190 is inserted into the third mounting portion 204-3, which is a circular hole, and the third mounting leg portion 202-3 is inserted into the second mounting portion 204-2, which is an arcuate groove. Accordingly, at the filter component 190 attached to the far side, the first and third mounting leg portions 202-1 and 202-3 are partially exposed into the battery loading part 178. In addition, the first mounting leg portions 202-1 of the left and right filter components 190 are different from each other in the position of the region that is exposed into the battery loading part 178.

As shown in FIG. 10, the first mounting leg portion 202-1 of the filter component 190 has a part thereof projecting from an inclined surface 206 of the battery loading part 178. The second mounting leg portion 202-2 (or the third mounting leg portion 202-3) has the flat surface 204 thereof slightly projecting from a vertical surface 208 of the battery loading part 178. When the battery B is loaded into the battery loading part 178 by sliding the battery B in the sliding direction (downward as seen in the figure), a locking portion (not shown) of the battery B engages the battery loading part 178, thereby allowing the battery B to be locked in the battery loading part 178. At this time, as shown in FIG. 11, the first mounting leg portion 202-1 of the filter component 190 abuts against the battery B and is pressed by the battery B in the sliding direction, resulting in being crushed. In addition, when the battery B is loaded into the battery loading part 178, the second mounting leg portion 202-2 (or the third mounting leg portion 202-3) is pressed at the flat surface 204 thereof by the battery B and thus slides in a crushed state. When the battery B has been loaded, the flat surface 204 is keeping in engagement with the battery B. Thus, when loaded, the battery B is in press-contact with the first mounting leg portion 202-1 and second mounting leg portion 202-2 (or third mounting leg portion 202-3) of the filter component 190. Accordingly, vibration and play of the battery B with respect to the housing 192 are absorbed by the first mounting leg portion 202-1 and the second mounting leg portion 202-2 (or the third mounting leg portion 202-3), thus being suppressed. In other words, the first to third mounting leg portions 202-1, 202-2 and 202-3 of the filter component 190, which are made of elastic material, function as elastic absorbing parts, thereby making it possible to suppress vibration and play of the battery B.

In the belt-type grinding tool 100, the mounting leg portions of the filter components 190 function also as elastic absorbing parts for suppressing vibration and play of the battery B. Therefore, by replacing the filter components 190, the filters 196 and the elastic absorbing parts for the battery B can be simultaneously replaced. Consequently, it is possible to reduce time and effort to perform the replacing operation, and it is also possible to reduce the parts number and to facilitate the parts management even more. It should be noted that in the above-described form the filter components 190 having the same configuration can be attached to either of the left and right sides. Accordingly, the filter component 190 which has been attached to one of the left and right sides can be attached to the other side. For example, the filter component 190 attached to the near side as seen in the figures has the second mounting leg portion 202-2 projecting into the battery loading part 178. If this filter component 190 is attached to the far side as seen in the figures, the third mounting leg portion 202-3 projects into the battery loading part 178 this time. Regarding the first mounting leg portion 202-1 also, a portion thereof that is hidden in the first mounting portion 204-1 when the filter component 190 is attached to the near side is reversed to project into the battery loading part 178 when the filter components 190 is attached to the far side. That is, even the same filter component 190 has a different portion projecting into the battery loading part 178 according to which side (left or right) the filter component 190 is attached to. Accordingly, if the exposed portions of the first to third mounting leg portions 202-1, 202-2 and 202-3 have been worn away, although the filter 196 is still usable, the filter component 190 in question is attached to the other side to use different portions of the first to third mounting leg portions 202-1, 202-2 and 202-3 as elastic absorbing parts to recover the play suppressing function, thereby allowing the filter component to be used even more continuously.

Although some forms of the present disclosure have been described above, the present disclosure is not limited to the described forms. For example, the configuration of the filter components and the number and configuration of mounting leg portions can be changed appropriately. In addition, two filter components that are attached to the mutually opposite surfaces need not always have the same configuration. Further, although in the foregoing form a belt-type grinding tool is shown as an example of power tool, the present disclosure is also applicable to other forms of power tools such as grinders and chamfering machines.

What is claimed is:

1. A power tool configured to be driven by a detachably loaded battery, the power tool comprising:

a housing having a battery loading part and an air inlet opening; and a filter component detachably attached to the housing, the filter component having a filter covering the air inlet opening, the filter component further having a filter securing part holding the filter and secured to the housing, the filter securing part being partially exposed into the battery loading part;

wherein when a battery is loaded into the battery loading part, the filter securing part abuts against the battery to suppress play of the battery with respect to the housing.

2. The power tool of claim 1, wherein the battery loading part is configured such that the battery is loaded thereinto by sliding the battery in a predetermined sliding direction, and wherein the air inlet opening has a first air inlet opening and a second air inlet opening which are respectively formed in surfaces opposite to each other in a direction perpendicular to the sliding direction; and wherein the filter component is attached to each of the first air inlet opening and the second air inlet opening, the filter component attached to the first air inlet opening and the filter component attached to the second air inlet opening have a same configuration.

3. The power tool of claim 1, wherein the filter securing part has a frame portion surrounding a perimeter of the filter to hold the filter, and first, second and third mounting leg portions projecting in a same direction from the frame portion, the first, second and third mounting leg portions being disposed to form an isosceles triangle in which the first mounting leg portion is at a vertex forming a vertex angle and the second and third mounting leg portions are at vertexes forming two base angles, respectively, the first mounting leg portion and one of the second mounting leg portion and the third mounting leg portion being exposed into the battery loading part to abut against the battery.

4. The power tool of claim 3, wherein each of the second and third mounting leg portions has a flat surface chamfered in a direction perpendicular to a base of the isosceles triangle to face outward of the isosceles triangle, so that when the battery is loaded into the battery loading part, one of the flat surfaces of the second and third mounting leg portions engages the battery.

5. The power tool of claim 3, wherein the battery loading part is configured such that the battery is loaded thereinto by sliding the battery in a predetermined direction, the first mounting leg portion having a circular columnar shape so that when the battery is loaded into the battery loading part, the first mounting leg portion is pressed in the sliding direction by the battery.

6. The power tool of claim 1, further comprising:

a motor disposed in the housing; and a fan attached to a rotating shaft of the motor;

wherein when the fan is rotated by the motor, outside air is sucked into the housing from the air inlet opening through the filter to pass around the motor before being discharged from the housing.

* * * * *